(12) United States Patent
Potlapally et al.

(10) Patent No.: US 9,792,143 B1
(45) Date of Patent: Oct. 17, 2017

(54) PLATFORM SECURE EXECUTION MODES

(71) Applicant: Amazon Technologies, Inc., Reno, NV (US)

(72) Inventors: Nachiketh Rao Potlapally, Arlington, VA (US); Derek Del Miller, Austin, TX (US); Mark Bradley Davis, Austin, TX (US); Matthew Shawn Wilson, Bainbridge Island, WA (US); Eric Jason Brandwine, Haymarket, VA (US); Anthony Nicholas Liguori, Bainbridge Island, WA (US); Rahul Gautam Patel, Austin, TX (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/921,555

(22) Filed: Oct. 23, 2015

(51) Int. Cl.
  *G06F 9/455* (2006.01)
  *G06F 21/74* (2013.01)
  *G06F 21/62* (2013.01)
  *G06F 21/72* (2013.01)

(52) U.S. Cl.
  CPC ...... *G06F 9/45558* (2013.01); *G06F 21/6218* (2013.01); *G06F 21/72* (2013.01); *G06F 21/74* (2013.01); *G06F 2009/45587* (2013.01)

(58) Field of Classification Search
  None
  See application file for complete search history.

(56) References Cited

U.S. PATENT DOCUMENTS

| | | | | |
|---|---|---|---|---|
| 8,176,336 B1* | 5/2012 | Mao | ......................... | H04L 9/006 713/189 |
| 2014/0137180 A1* | 5/2014 | Lukacs | .................... | G06F 21/53 726/1 |
| 2014/0208097 A1* | 7/2014 | Brandwine | ........... | H04L 9/3263 713/156 |
| 2014/0208111 A1* | 7/2014 | Brandwine | .......... | H04L 63/0428 713/171 |
| 2014/0230024 A1* | 8/2014 | Uehara | ................ | H04L 63/1433 726/4 |
| 2015/0143362 A1* | 5/2015 | Lukacs | ................ | G06F 9/45558 718/1 |

* cited by examiner

*Primary Examiner* — Dong Kim
(74) *Attorney, Agent, or Firm* — Hogan Lovells US LLP (57) ABSTRACT

The performing of virtual machine (VM)-based secure operations is enabled using a trusted co-processor that is able to operate in a secure mode to perform operations in a multi-tenant environment that are protected from other VMs and DOM-0, among other domains and components. A customer VM can contact a VM manager (VMM) to perform an operation with respect to sensitive data. The VMM can trigger secure mode operation, whereby memory pages are marked and access blocked to entities outside a trusted enclave. The trusted co-processer can measure the VMM and compare the result against an earlier result to ensure that the VMM has not been compromised. Once the operations are performed, the trusted co-processer can return the results, and the VMM can exit the secure mode such that access to the marked pages and customer data is restored.

18 Claims, 6 Drawing Sheets

PLATFORM SECURE EXECUTION MODES

BACKGROUND

As an increasing number of applications and services are being made available over networks such as the Internet, an increasing number of content, application, and service providers are turning to technologies such as cloud computing. Cloud computing, in general, is an approach to providing access to electronic resources through services, such as Web services, where the hardware and/or software used to support those services is dynamically scalable to meet the needs of the services at any given time. A customer typically will rent, lease, or otherwise pay for access to resources through the cloud, such that the customer does not have to purchase and maintain the hardware and software to provide access to these resources. A potential disadvantage to such an approach, at least from a customer point of view, is that the resources typically are at a location under control of the provider of those resources, and thus are out of the direct control of the customer. Further, the resources are often shared with other customers such that data security may be compromised.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing security in a shared computing environment. In particular, various embodiments provide one or more platform secure operation modes that provide for the performing of virtual machine-based secure operations in such an environment. An example host computing device can include a virtual machine manager (VMM) that can provision and manage multiple virtual machines (VMs). A customer VM may request to have the VMM manage the performance of a computation on sensitive data (e.g., credit card data), as may include the encryption, decryption, or singing of sensitive customer data, among other such options. Various such environments can take advantage of a general purpose co-processor running trusted firmware, referred to herein as a trusted co-processor, which can be provided as part of a peripheral device in some embodiments. The co-processor can be one of a class of network processors and/or network storage accelerators, among other such options, but is able to operate in a secure mode. When a request to perform a secure operation is received from a customer VM, the VMM can cause the system to operate in a secure mode, creating a secure partition or secure enclave on the commodity platform. The secure mode can cause memory pages for the operations to be marked and access locked such that the pages are only accessible to the trusted co-processor and/or customer VM. The trusted co-processor can perform measurements on the VMM, such as upon boot, upon modification or update, and/or in response to the request, and ensure that the measurements match in order to determine that the VMM is still a trusted VMM. The trusted co-processor can thus authenticate the VMM code and protect a portion of memory from components such as other VMs and DOM-0, providing for a secure processing environment without modification to the hardware or system architecture.

Various other applications, processes, and uses are presented below with respect to the various embodiments.

Figure 1:
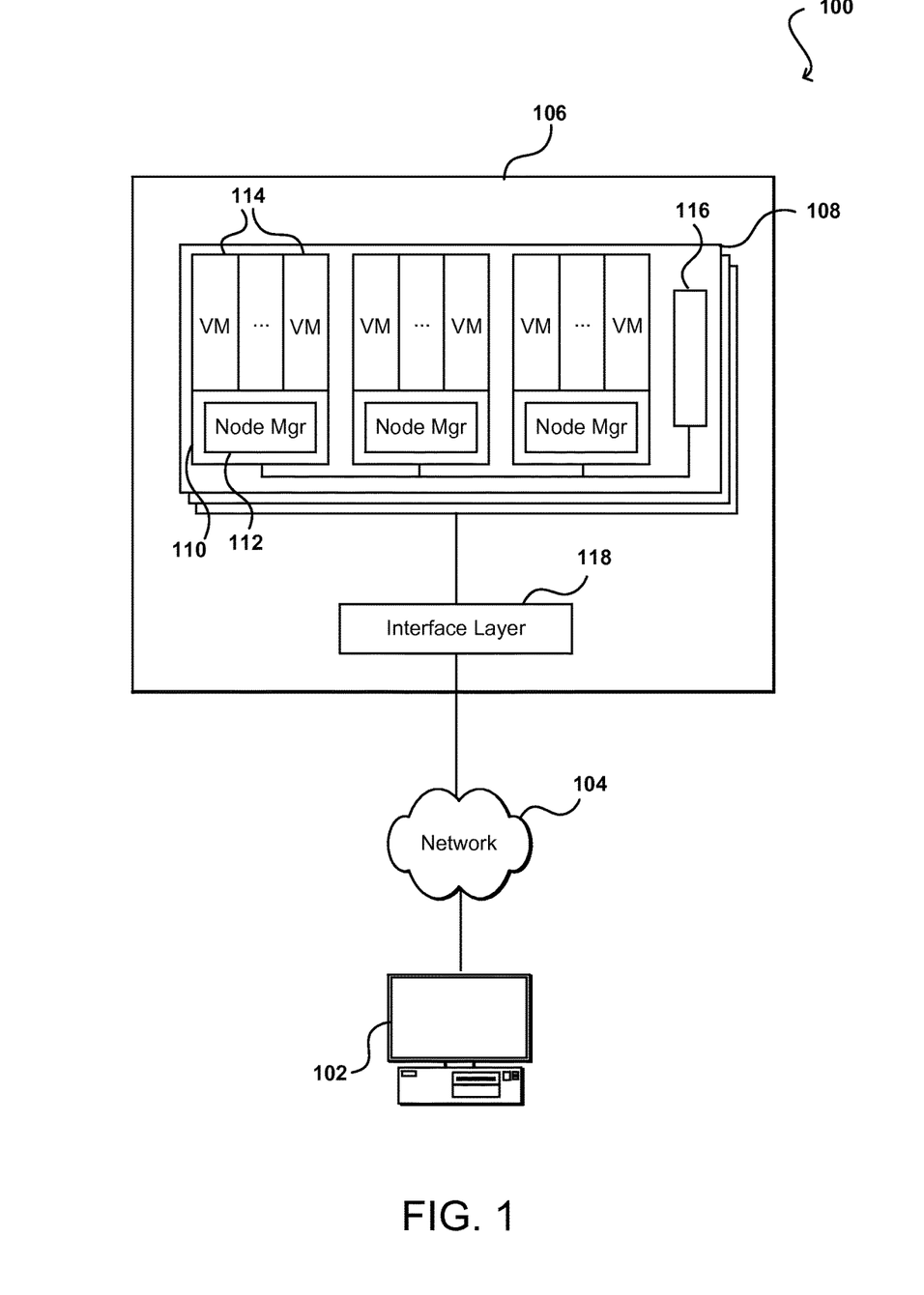
FIG. 1 illustrates an example environment in which various embodiments can be implemented.

FIG. 1 illustrates an example environment 100 in which aspects of the various embodiments can be implemented. In this example, a user is able to utilize a computing device 102 to submit a call or request across at least one network 104 to be received to a shared resource environment 106, such as a data center or "cloud" environment, among other such options. The computing device 102 can include any appropriate device, as may include client devices such as personal computers, cell phones, handheld messaging devices, laptop computers, set-top boxes, personal data assistants, electronic book readers, and the like. The at least one network 104 can include any appropriate wired and/or wireless network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail.

The resource environment 106 in this example includes an interface layer 118, as may include components such as application programming interfaces (APIs), routers, switches, Web servers, and other such components known or used for routing communications from a user computing device 102 to an appropriate resource in the environment. In this example, the resource environment 106 includes a number of racks 108, each rack including a number of host computing devices 110, as well as an optional rack support computing system 116 in this example embodiment. The host computing systems 110 on one of the illustrated racks 108 each host one or more virtual machines 114 in this example, as well as a distinct virtual machine manager 112 associated with the virtual machines on that host computing system. The virtual machine manager (VMM) is tasked with managing the virtual machines (VMs) on the respective host device, and handling various aspects of virtualization. Each virtual machine 114 can act as an independent computing resource for executing one or more tasks on behalf of a user, where the virtual machine functions as a dedicated resource for the user. The environment can also include additional host computing systems that do not include distinct virtual machines, but may nonetheless each act as a computing resource for one or more users. The rack support computing system 116 may provide various utility services for other computing systems local to its rack (e.g., long-term program storage, metering, and other monitoring of program execution and/or of non-local block data storage access performed by other computing systems local to the rack, etc.), as well as possibly to other computing systems located in the environment 106. Each computing system may also have one or more local attached storage devices (not shown), such as to store local copies of programs and/or data created by or otherwise used by the executing programs, as well as various other components.

It will be appreciated that the example of FIG. 1 has been simplified for the purposes of explanation, and that the number and organization of host computing systems and other devices may be much larger than what is depicted in FIG. 1. For example, as one illustrative embodiment, there may be approximately tens of thousands of computing systems in a cloud environment, with at least some of those computing systems being host computing systems that may each host multiple virtual machines.

Figure 2:
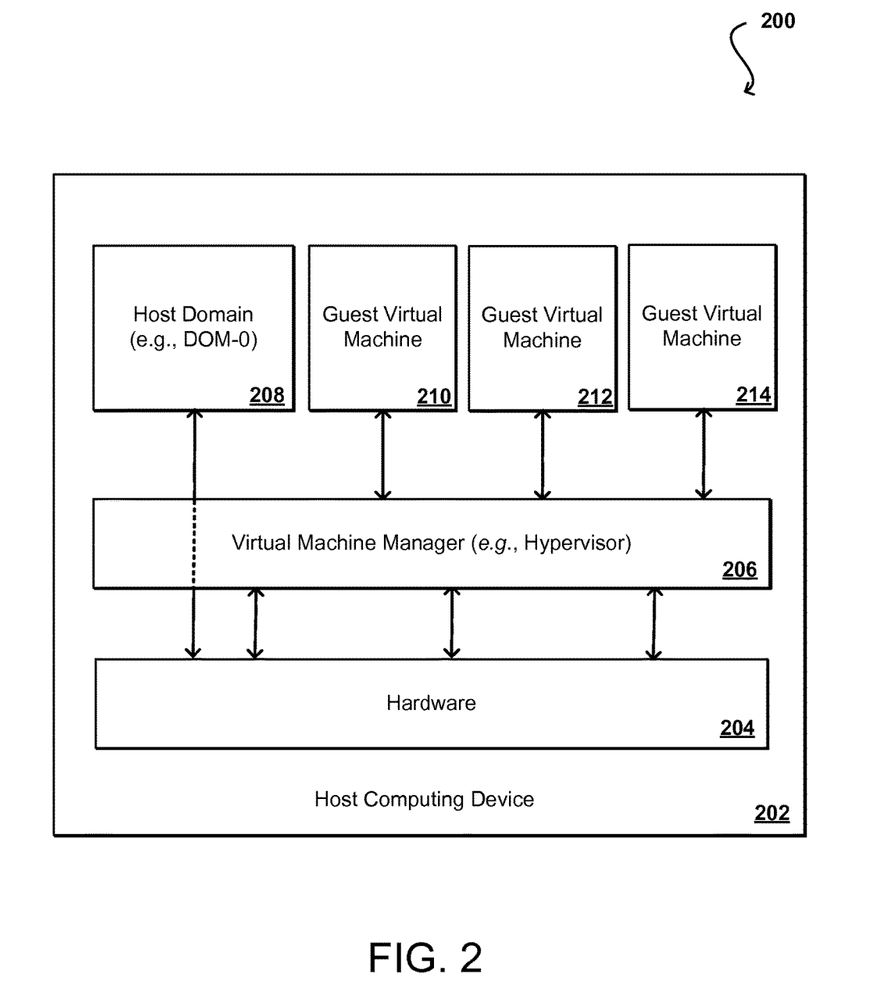
FIG. 2 illustrates an example configuration for a virtual machine manager running multiple guest virtual machines that can be used in accordance with various embodiments.

A number of virtualization techniques can be used to simultaneously operate a plurality of guest virtual machines (VMs) or guest operating systems (OSs) on a given host machine. FIG. 2 illustrates an example 200 of utilizing one virtualization technique using a virtual machine manager (VMM), such as a hypervisor, in accordance with various embodiments. The hardware 204 (e.g., the central processor and other such components) of the host computing device 202 is able to interface with the VMM 206 running directly on the hardware 204, such in the case of a "bare metal" or native hypervisor. Examples of hypervisors useful for such purposes include Xen, Hyper-V®, and the like. Hypervisors typically run at a higher, more privileged processor state than any other software on the machine, and provide services such as memory management and processor scheduling for dependent layers and/or domains. The most privileged of such layers and/or domains resides in the service domain layer, which may include a host domain 208 that may include an administrative operating system for configuring the operation and functionality of the hypervisor 206, as well as that of domains of lower privilege, such as the domains of the guest virtual machines 210, 212, 214 or other operating systems, which may be heterogeneous (i.e., running different operating systems than each other). The host domain 208 (e.g., the DOM-0) may have direct access to the hardware resources 204 of the host computing device 202 by way of the hypervisor 206, while the guest virtual machine domains 210, 212, 214 may not.

In certain embodiments, there can be various modes of operations. For example, to update the microcode on a host computing device, the host computing device can receive an update from a trusted source and enter a system management mode (SMM), such as by receiving a system management interrupt (SMI) to interrupt normal hypervisor execution. Entering SMM causes the execution of all the physical processor cores except for a single physical core (e.g., the bootstrapping core) in the processor to be suspended in at least some conventional designs. The single physical core that remains executing will be responsible for applying the update. In some embodiments, it may be ensured that the processor finishes executing all of the update for the particular instruction that it was executing at the time of detecting the SMI or other interrupt signal before suspending the execution of the physical cores. The received update (e.g., for firmware, software, or microcode) can be signed and/or encrypted by a trusted source, such as the service provider or processor manufacturer. In one example, the update can be signed using a private key or other such credential of a trusted source in order to ensure authenticity of the update. If the update is signed using a private key, the host computing device may need to validate the signature of the update before applying the patch. In some embodiments, the public key used to verify the signature can be stored in a trusted platform module (TPM) (not shown) on the host computing device. In some embodiments, the update can be encrypted using asymmetric or symmetric cryptography. For example, the update may be encrypted using a public key in order to ensure privacy of the update. If the update is encrypted, then any intermediate parties that handle the update cannot read the update or ascertain its contents unless they have access to the private key used to the decrypt the update. If the update is encrypted, then the private key to decrypt the update can be stored to the TPM, similarly to the public key for verifying the update, as previously described. Once the update is authenticated and/or decrypted, the update can be applied to the host computing device 202. If SMM is used to apply the update, then the instructions to apply the update can be implemented in an SMI handler, or SMI handler can cryptographically verify and call a patch function pre-configured in a hypervisor. A potential downside to such an approach, however, is that the virtual machine manager (VMM) on a host machine that is exposed to one or more outside users can become compromised. As a result, one of the guest virtual machines (VMs) 210, 212, 214 on the host computing device 202 can potentially access the TPM in the host hardware 204 through the hypervisor 206.

Various other security functions can be performed in such an environment as well. These can include, for example, the encryption and/or decryption of data, signing, encryption with a public or private key, and the like. Where these actions are performed for a specific VM, such as a VM associated with a customer having an account with the resource provider, it may be necessary to utilize one or more keys or other "secrets" that should be known and/or accessible only to the customer VM and the customer associated with that VM. In an architecture such as that illustrated in FIG. 2, there might be a glitch in the VMM, a related VM, or another such component that can potentially be exploited in order to access these secret values that are being processed by the customer VM.

Figure 3:
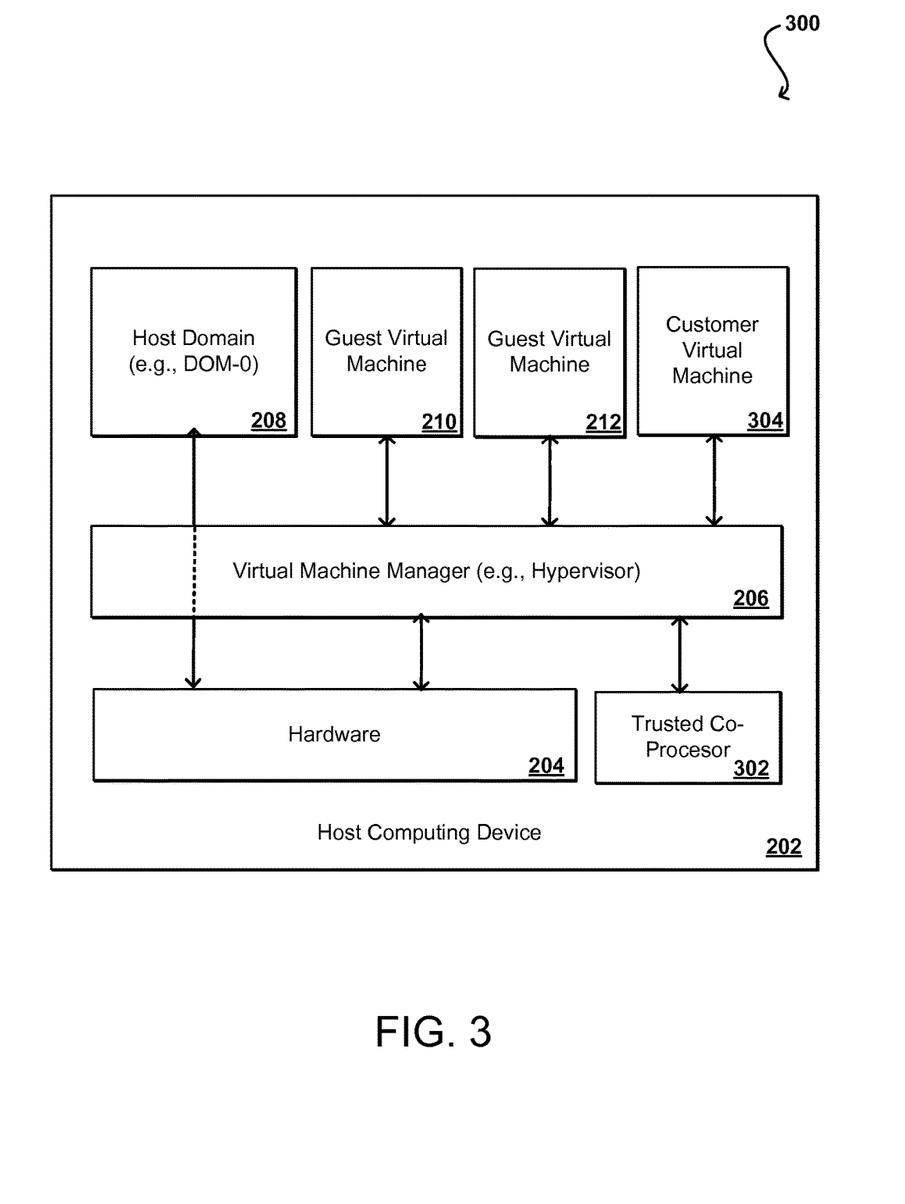
FIG. 3 illustrates an example environment including a trusted co-processor that can be utilized in accordance with various embodiments.

Accordingly, approaches in accordance with various embodiments can attempt to improve security in such an environment while ensuring that customer secrets, keys, secure data, and other such objects are well secured within that environment. FIG. 3 illustrates an example environment 300 that can be used to provide such security. It should be noted that reference numbers for similar components can be carried over between figures for purposes of simplicity of explanation, but such usage should not be interpreted as a limitation of the scope of the various embodiments unless otherwise specifically stated. In this example, at least one of the guest VM's is a customer VM 304 associated with a customer having an account with a resource provider, where the resource provider environment includes the host computing device 202. Further, the host computing device 202 includes a trusted co-processor 302, or secure co-processor, that can communicate with the VMM 206 and other components of the host machine. The trusted co-processor can be a peripheral device, for example, such as a PCI device that is removable from the host computing device 202. The trusted co-processor can include one or more processors, memory, one or more interfaces, and any other components or connections known for providing a peripheral device or additional processor to such a system. In one embodiment, the trusted co-processor is an independent hardware component that takes the form of a separate PCIE card that includes specific firmware. The configuration of the trusted co-processor enables it to be logically considered to be within a trust boundary, trust region, or trusted enclave, associated with the customer VM.

The firmware on the trusted co-processor 302 can be configured to measure the VMM 206 for the host device, such as by analyzing some or all of the contents of the VMM and generating a hash value, using an appropriate hashing algorithm, and storing the hash in resident memory on the trusted co-processor. The trusted co-processor can be configured to perform various tasks for the VMM 206 while securely storing the measurement hash value and other secure data or objects, such as one or more cryptographic keys that may have been received (or generated) for the customer. In some embodiments, the measurement occurs upon a booting of the VMM, although measurements in response to verified updates or other such actions can occur as well within the scope of the various embodiments. The VMM can then perform various tasks typical for such an environment, as may include launching and managing guest virtual machines on the host device.

At some point the customer virtual machine 304 may request to have one or more critical or secure computations performed, as may related to operations on sensitive data. Accordingly, the customer VM 304 can issue a call, such as a hypercall, to the VMM to initiate secure computations. In this example, the call can also include a request to enter a secure mode of operations, although in some embodiments the secure mode can be entered automatically according to the content or type of request, among other such options. In some embodiments a component can exist within the VMM that exposes a set of hypercalls to the customer VM that enable the entering and existing of the secure mode, among calls for secure operations and other such tasks. A software component inside the VMM can be responsible for implementing the logic behind the hypercalls, such as to lock up the memory pages and allow only the trusted co-processor to obtain access. The secure mode can also lock out the updating or modifying of software in the VMM among other such options. In response to such a call, the VMM 206 can take various security measures in order to determine and mark the appropriate memory pages for the customer VM request, as may include memory pages in which keys are being held. Normally these pages may be accessible to other domains, guest VMs, administrative VMs (i.e., DOM-0 208), or other such components, so it can be necessary in at least some embodiments to identify these pages in order to secure them from at least temporary access by these components. The VMM can mark these pages as secure such that the pages cannot be shared with any other domain, and the VMM 206 can also ensure that there will be no DMA access, or other such access, granted for the pages other than from the trusted co-processor 302 of the host machine. In one embodiment, the VMM knows the PCIE address of the trusted co-processor 302, whereby the VMM can restrict access to the marked pages to requests received from that address.

The marked pages can have data on which a secure operation is to be performed, along with any customer keys for the operation. In other embodiments the VMM may provide or provision the keys, such that the memory pages only hold the data for the operation, such as data to be encrypted, decrypted, or signed. Before performing such an operation, however, the trusted co-processor 302 can first re-measure the VMM, such as to generate a current measurement hash for the VMM. The trusted co-processor can then compare the current has value against the prior hash value to ensure that the VMM hasn't unexpectedly changes or become corrupted. Approaches for generating and comparing hash values are well known in the art and, as such, will not be discussed herein in detail. This helps to ensure that the VM making the call was not a malicious VMM or other VM. As long as the current hash matches the hash value from the original boot, a determination can be made that the VMM 206 is still a trusted VMM. In at least some embodiments, the trusted co-processor 302 measures the VMM by reading addresses in DMA memory, for example, where the VMM code is running and generating a hash of those addresses. If the VMM is trusted, the co-processor can proceed with the secure operation, such as may require utilizing one or more customer keys stored by the trusted co-processor. If the hash values do not match, the entire operation can be aborted in at least some embodiments, while in others a notification might be sent that authorization is needed before proceeding, among other such options. If the operation proceeds, the trusted co-processor 302 can perform the operation to completion then provide the results (securely or otherwise) to the VMM 206, which can exit the secure mode of operations and unmark the memory pages, among other such options.

Such a mode of operations can provide a platform-secure execution mode that provides enhanced security for secret data and objects, as may be stored for a customer virtual machine or other such real or virtual component. The host processor and trusted peripheral processor can operate using privileged modes discussed herein to provide for the enhanced security of secrets in a shared or multi-tenant environment. The platform secure execution mode in at least some embodiments allows software applications in a customer VM to securely access cryptographic functionality in the trusted and high-privileged peripheral, or trusted co-processor, and use that functionality to cryptographically protect (i.e., encrypt, decrypt, sign, verify, or hash) sensitive information in the customer VM. As mentioned, examples of cryptographic functionality in the peripheral can include key management, key storage, and cryptographic algorithm execution. In the platform secure mode, only the customer VM and trusted host/co-processor software can read or use customer assets such as cryptographic keys and customer data being cryptographically protected using these keys in at least some embodiments. During the platform secure execution mode, the customer assets can be restricted from access to the VMM (i.e., Hypervisor) management interfaces used for controlling VMs, DMA devices, and other co-resident VMs.

Figure 4:
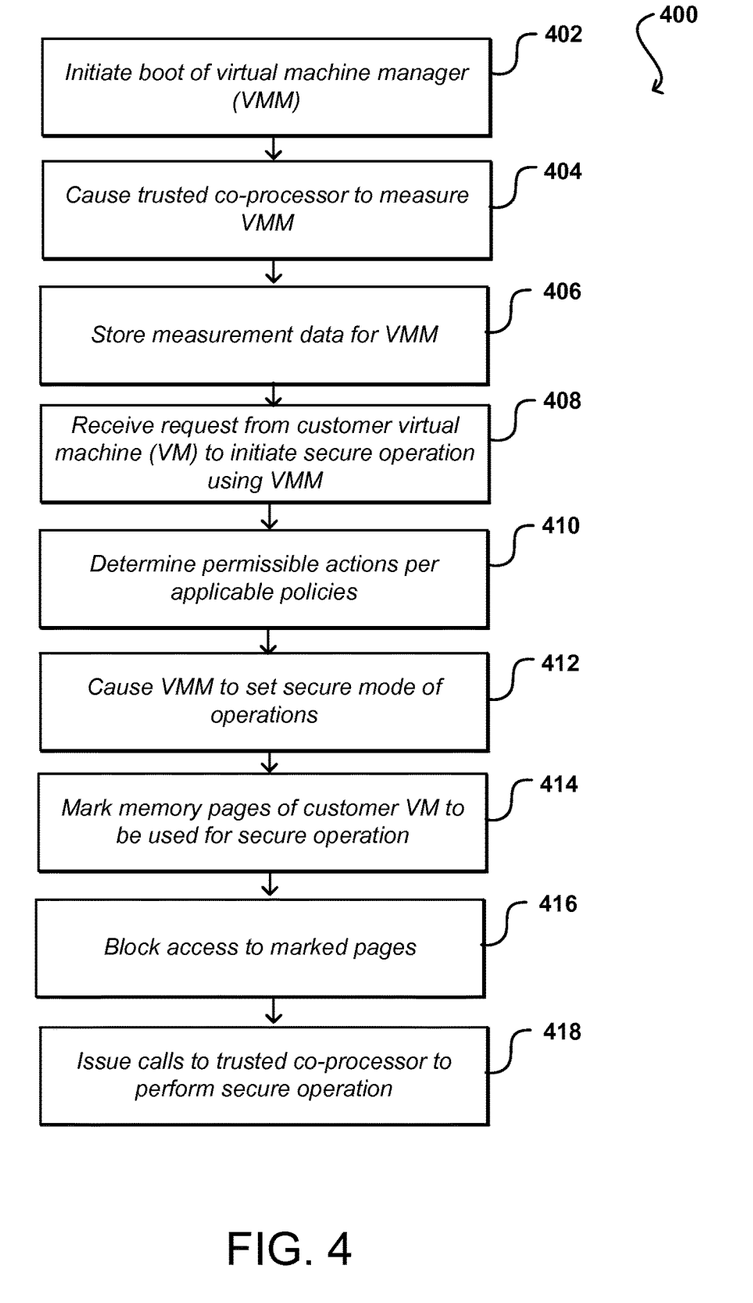
FIG. 4 illustrates a first portion of an example process for performing virtual machine-based secure operations that can be utilized in accordance with various embodiments.

FIG. 4 illustrates a first portion of an example process 400 for performing VM-based secure operations that can be utilized in accordance with various embodiments. It should be understood that, for any process discussed herein, there can be additional, fewer, or alternative steps, performed in similar or different orders, or in parallel, within the scope of the various embodiments unless otherwise stated. In this example, a booting of a virtual machine manager (VMM) is initiated 402, such as may be part of a host computing system boot process. A trusted co-processor of the host device can be caused 404 to measure the VMM. As discussed, this can involve secure world firmware (SWF) of the co-processor determining aspects or contents of the code for the VMM upon a secure or measured boot of the VMM and generating a hash of the code, among other such options. The measurement data for the VMM can then be stored 406 in a secure location, such as in secure memory of the trusted co-processor.

Subsequently, a request (i.e., hypercall) can be received 408 from a customer virtual machine (VM) to initiate the performance of one or more secure operations using the VMM. As mentioned, the secure operations can include the encryption, decryption, or signing of data, among other such options. The data can be stored by the customer VM, stored by the trusted co-processor, received over a secure channel, or otherwise obtained or provided. The secure operations can also involve one or more customer keys, which can be securely stored in a trusted platform module (TPM) or the trusted co-processor, provided by the customer VM, retrieved from a key management service, or otherwise securely obtained. In at least some embodiments, there may be one or more policies in place that indicate permissible and/or disallowed actions that can be taken in a secure mode for performing the secure operations. These polices can be set by the resource provider, the customer, a system administrator, or other such source, and can dictate actions that can be taken with respect to the data, actions taken by the customer VM or VMM, actions taken by the trusted co-processor, and the like. In some embodiments, one or more policies can indicate properties or functional aspects of a secure mode of operations, such as which entities are included in a trust boundary for the secure mode, which operations can be performed within the trust boundary, which connections are permissible, which components have access to which other components as well as the type of access, etc. In addition to permissions, policies can also indicate specific actions to be taken in the secure mode, actions to be taken for specific types of data or request, and the like.

Assuming the secure mode is determined 410 permissible under the current conditions and the system is able to comply with any relevant policies, the VMM can be caused 412 to set or enter a secure (i.e., platform secure) mode of operations. This can trigger the VMM to establish a trusted enclave in at least some embodiments. The VMM can also mark 414 the appropriate memory pages of the customer VM to be used for the secure operations, such as to securely store the data or keys for the secure operation(s). Access (i.e., DMA access) to the marked pages can be blocked 416, such that access is restricted to the trusted co-processor and customer VM in at least some embodiments. In other embodiments, at least access by other domains or VMs is restricted. The VMM can then issue 418 calls, such as co-processor memory mapped I/O (MMIO) calls to perform the secure operation(s) using the customer VM data.

Figure 5:
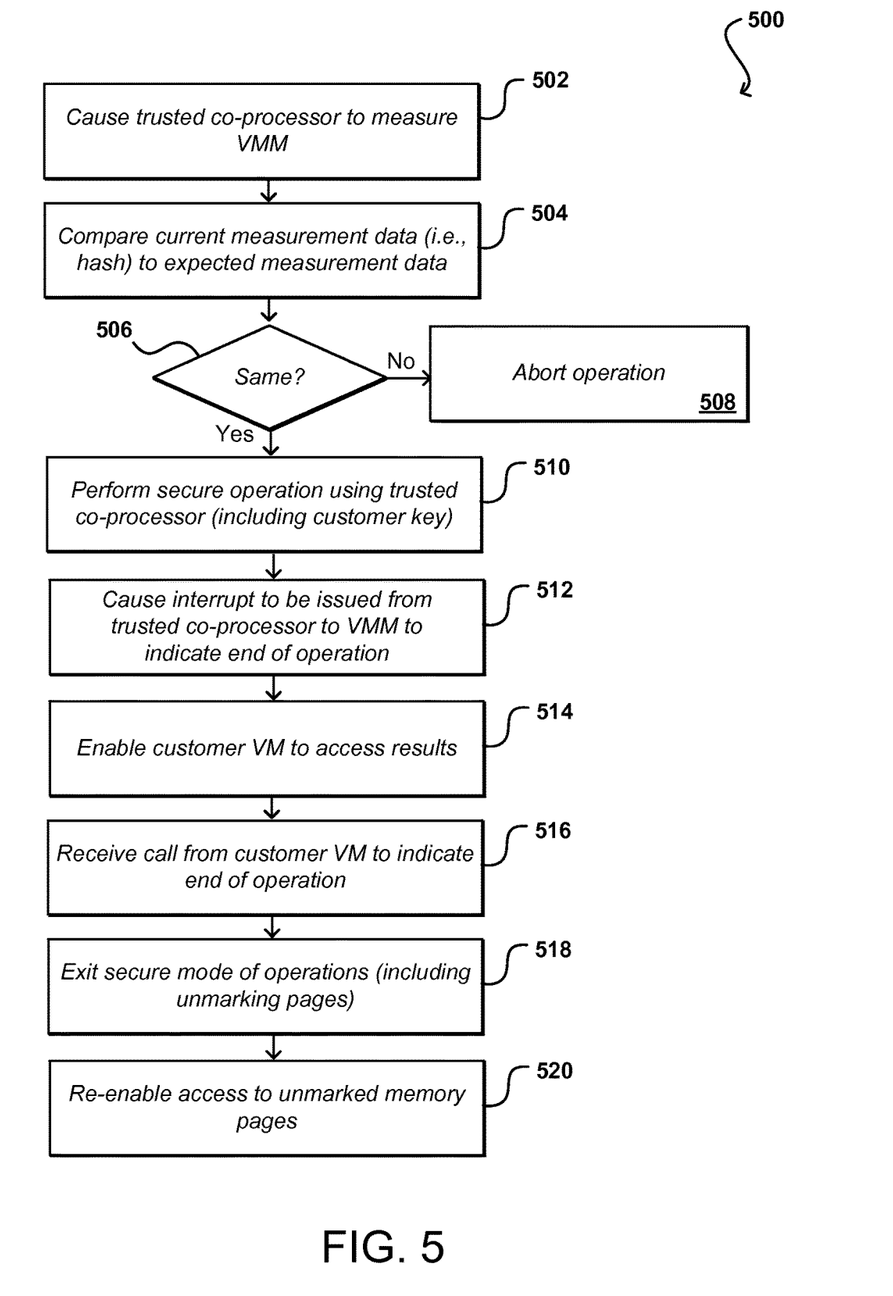
FIG. 5 illustrates a second portion of an example process for performing virtual machine-based secure operations that can be utilized in accordance with various embodiments.

FIG. 5 illustrates a second portion 500 of an example process for performing VM-based secure operations that can be utilized in accordance with various embodiments. In this example, the call(s) to perform the secure operations are received and the trusted co-processor is notified of the operations. The trusted co-processor can be caused 502 to dynamically re-measure the VMM, such as by determining the current addresses of the code for the VMM and generating a hash using the same hashing algorithm to measure the VMM upon boot. The current measurement data can be compared 504 against the prior or expected measurement data to determine whether the values match or correspond, such as by having the same value or a value that deviates by at most a determined amount or in a specified way, etc. As mentioned, the expected measurement data can have been obtained at boot or startup, while in at least some embodiments the hash can be updated for any trusted or expected change in the VMM that can potentially change or affect the hash value, among other such options. If the hash (or other measurement) values are determined to not be the same 506, the secure operation can be aborted 508 or another appropriate action taken as discussed and suggested herein. This can be performed due to the fact that unexpected differences in the values can correspond to changes in the VMM, such as may be the result of corruption by runtime malware.

If the hashes are determined to be the same, or otherwise match or correspond, the secure operation(s) for the request can be performed 510 using the trusted co-processor, along with any customer keys or other secure data as may be stored by, or accessible to, the trusted co-processor. This can include, for example, the secure world firmware of the co-processor encrypting or decrypting customer data using customer keys without the keys ever leaving the trusted co-processor. In some embodiments, as mentioned elsewhere herein, the co-processor can cause the customer keys to be provisioned in the trusted enclave and accessible by the customer VM in order to perform the secure operations, among other such options. Further, in at least some embodiments a customer VM (or other authorized component or entity) can issue a request to abort or interrupt the secure operation, which can result in any changes not being committed, the memory pages being unmarked, an exit of the secure mode of operations, etc. An interrupt can be caused 512 to be issued from the (secure world firmware of the) trusted co-processor to the VMM to indicate the end of the secure operation(s). The customer VM, and applications executing on the customer VM, can be enabled 514 to access the results of the secure operation(s). A call (i.e., hypercall) can be received 516 from the customer VM to indicate the end of the secure operation(s). The VMM can then exit 518 the secure mode of operations, as may include unmarking the marked memory pages, destroying the trusted enclave, and re-enabling access 520 to the customer data, among other such tasks. The unmarked memory pages then again can be accessible to less privileged software in the environment.

In some embodiments, a customer might be able to provide or specify one or more policies to be enforced in the resource provider environment. The VMM and/or trusted co-processor can be responsible for enforcing these policies while operating in the secure mode. A customer security policy in some embodiments can specify tasks that may, or may not, be performed by the customer VM, buckets that may be accessed, etc. In some embodiments the trusted co-processor will include a security policy enforcement mechanism or other such component for obtaining and/or enforcing the appropriate customer policies during secure mode of operations.

Figure 6:
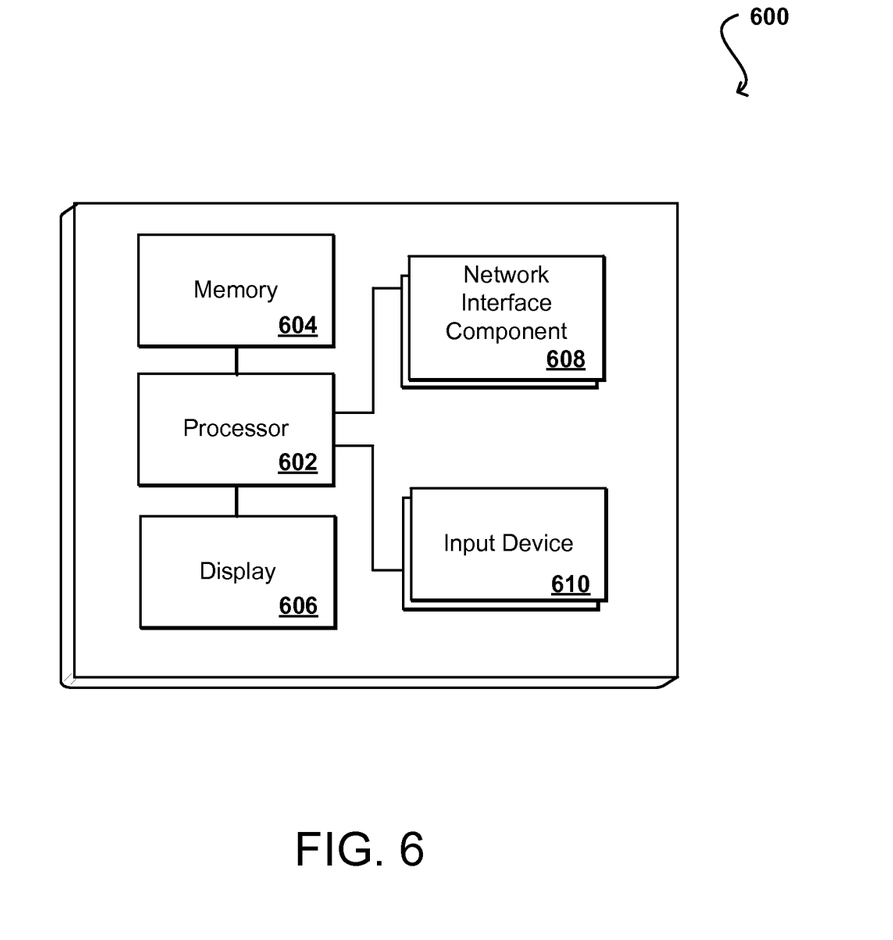
FIG. 6 illustrates example components of a computing device that can be utilized in accordance with various embodiments.

FIG. 6 illustrates a logical arrangement of a set of general components of an example computing device 600. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one input element 608 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more network interface elements 608 for communicating over various networks, such as a Wi-Fi, Bluetooth, RF, wired, or wireless communication systems. The device in many embodiments can communicate with a network, such as the Internet, and may be able to communicate with other such devices.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device 610 (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A host computer system, comprising:
   at least one processor configured to operate a virtual machine manager (VMM);
   a peripheral device including a co-processor configured to communicate with the VMM; and
   memory storing instructions that, when executed by the at least one processor, cause the host computer system to:
   cause the co-processor to generate a first hash value of code for the VMM;
   receive a request from a customer virtual machine (VM) running on the VMM, the customer VM associated with a customer having an account with a provider of the host computer system, the request involving an operation involving data indicated to be sensitive data for the customer;
   cause the host computer system to operate in a secure mode wherein memory pages within the customer VM for the request are marked for access restricted to the customer VM and the co-processor;
   cause the co-processor to generate a second hash value of code for the VMM;
   receive, from the co-processor, result data for the operation in response to coprocessor determining that the second hash value matches the first hash value; and
   cause the host computer system to cease operating in the secure mode and remove the access restriction from the memory pages within the customer VM.

2. The host computer system of claim 1, wherein the instructions when executed further cause the host computer system to:
   receive a subsequent request from the customer VM;
   cause the host computer system to operate in the secure mode;
   cause the co-processor to generate a third hash value of code for the VMM; and
   receive, from the co-processor, a response that the operation was not performed if the co-processor determines that the third hash value does not match the first hash value.

3. The host computer system of claim 1, wherein the instructions when executed further cause the host computer system to:
   cause the co-processor to generate the first hash value upon at least one of a boot or a modification of the host computer system.

4. The host computer system of claim 1, wherein the instructions when executed further cause the host computer system to:
   utilize a customer key to perform the operation, the customer key restricted to access in the host computer system by at most the customer VM and the co-processor.

5. A computer-implemented method, comprising:
   receiving a request from a guest virtual machine (VM) to a virtual machine manager (VMM) executing on a processor of a computing system, the request involving an operation associated with sensitive data for a user associated with the guest VM;
   causing the computing machine to operate in a secure mode, the secure mode causing one or more memory pages within the guest VM to be marked for access restricted to the guest VM and the trusted co-processor;

restricting access to the sensitive data to at most the guest VM and a trusted co-processor;

causing information for the request to be submitted to the trusted co-processor, the trusted co-processor configured to compare one or more current values for the VMM with one or more previously-determined values for the VMM to determine whether an unexpected modification has occurred to the VMM;

receiving result data from the trusted co-processor in response to the trusted co-processor determining that the unexpected modification has not occurred to the VMM and the trusted coprocessor thereafter having performed the operation; and providing the result data to the guest VM, access to the one or more memory pages within the VM being re-enabled for any component having the access before the restricting.

6. The computer-implemented method of claim 5, further comprising:

causing the trusted co-processor to generate the one or more previously-determined values upon a boot or modification of at least one of the computing system or the VMM.

7. The computer-implemented method of claim 5, further comprising:

causing the trusted co-processor to abort a subsequent operation in response to determining that one or more subsequent values for the VMM do not correspond to the one or more previously-determined values.

8. The computer-implemented method of claim 5, further comprising:

evaluating one or more policies to determine one or more actions permitted, or prevented, from being performed in the secure mode.

9. The computer-implemented method of claim 5, wherein the one or more memory pages include at least one key or sensitive data for the operation.

10. The computer-implemented method of claim 5, further comprising:

obtaining at least one key for the operation from at least one of the trusted co-processor, memory associated with the trusted co-processor, a trusted platform module, or a secure enclave on the computing device.

11. The computer-implemented method of claim 5, wherein the operation includes at least one of encryption, decryption, or signing of at least a portion of the sensitive data.

12. The computer-implemented method of claim 5, wherein the trusted co-processor is included in a peripheral device removable from the computing system, the peripheral device further including memory, dedicated firmware, and at least one data interface.

13. The computer-implemented method of claim 5, wherein the one or more current values for the VMM include one or more address values for code for the VMM, and further comprising:

generating a current hash of the one or more address values to compare against a previously-generated hash for the one or more address values.

14. The computer-implemented method of claim 5, wherein the co-processor is further configured to perform cryptographic functionality including at least one of key management, key storage, or cryptographic algorithm execution.

15. A system, comprising:

at least one processor configured to operate a virtual machine manager (VMM); and memory storing instructions that, when executed by the at least one processor, cause the system to:

receive a request from a guest virtual machine (VM) to the VMM, the request involving an operation associated with sensitive data for a user associated with the guest VM;

operate in a secure mode in response to receiving the request, the secure mode causing one or more memory pages within the guest VM for the operation to be marked for access restricted to the guest VM and the trusted co-processor;

restrict access to the sensitive data to at most the guest VM and a trusted co-processor of the system;

cause information for the request to be submitted to the trusted co-processor, the trusted co-processor configured to compare one or more current values for the VMM with one or more previously-determined values for the VMM to determine whether an unexpected modification has occurred to the VMM;

receive result data from the trusted co-processor in response to the trusted co-processor determining that the unexpected modification has not occurred to the VMM and the trusted co-processor thereafter having performed the operation; and provide the result data to the guest VM, access to the one or more memory pages within the guest VM being re-enabled for any component having the access before the restricting.

16. The system of claim 15, wherein the instructions when executed further cause the system to:

cause the trusted co-processor to abort a subsequent operation in response to determining that one or more subsequent values for the VMM do not correspond to the one or more previously-determined values.

17. The system of claim 15, wherein the instructions when executed further cause the system to:

evaluate at least one policy to determine one or more functional aspects of the secure mode.

18. The system of claim 15, wherein the trusted co-processor is included in a peripheral device removable from the computing device, the peripheral device further including memory, dedicated firmware, and at least one data interface.

* * * * *